Sept. 8, 1936.   L. GOLDHAMMER   2,053,867
PHOTOGRAPHIC CAMERA
Filed Feb. 6, 1935
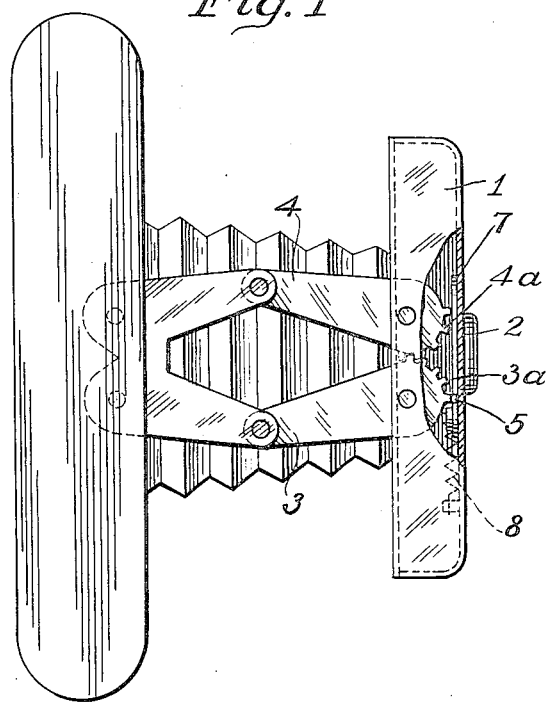
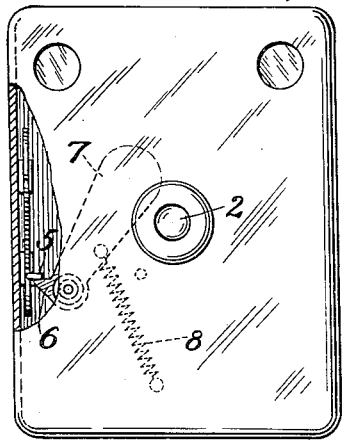 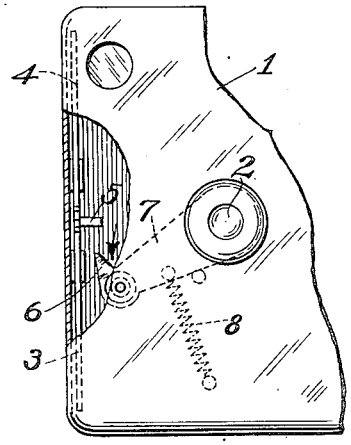
INVENTOR
Leo Goldhammer
BY
ATTORNEY Patented Sept. 8, 1936

2,053,867

UNITED STATES PATENT OFFICE 2,053,867

PHOTOGRAPHIC CAMERA

Leo Goldhammer, Munich, Germany, assignor to Agfa Ansco Corporation, Binghamton, N. Y., a corporation of New York Application February 6, 1935, Serial No. 5,198
In Germany February 7, 1934

3 Claims. (Cl. 95—39)

My present invention relates to photographic cameras.

One of its objects is to provide a camera with a device for an improved security against the entrance of light. Further objects will be seen from the detailed specification following hereafter. Reference is made to the accompanying drawing, in which—

Fig. 1 represents a side view of a bellows camera having a lens-panel extended and retracted by means of toggle members and fitted with the new light-excluding plate, Fig. 2 represents an end view of the camera in the position of readiness to take a photograph, and Fig. 3 represents an end view of the camera with the lens panel in the retracted position.

The constantly increasing sensitivity of photographic films necessitates the provision of new means for making the camera absolutely light-tight. It has been found, for instance, that apart from the light which enters by the red window, the protection against entrance of light by the plates of the sector shutter, which only rest lightly on one another, is not sufficient in the case of highly sensitive photographic material. Diffuse light penetrates into all cameras not provided with a base board which, in the nonoperative position of the camera, is located in front of the objective, nor with a protective cover, and the next photograph is fogged by preexposure. In order to avoid this a protective cover may be placed over the objective. Frequently, however, owing to forgetfulness, the protective cover, when such is provided is not removed before the photograph is taken, or is not placed on the objective after the photograph is taken. Moreover, a protective cover is easily lost; thus up to the present there has been no satisfactory means for excluding this diffuse light.

According to the invention a light-excluding plate is arranged in the shutter or in the casing of the camera and this plate is so arranged as to come into the path of the light rays as soon as the objective is taken out of the photographing position.

The covering plate thus provided may be actuated, for example, by the front ends of the camera toggle members which are provided for the purpose with a stop located in the range of pivotal movement of the light-excluding plate.

A construction according to the invention will be described with reference to the accompanying drawing in which part of the lens panel has been broken away for the sake of clarity.

The shutter housing 1 and the objective 2 are supported by the toggle members 3 and 4. The toggle members in the vicinity of the objective are provided in known manner with teeth 3a and 4a respectively in order that the toggle members may move uniformly when the camera is opened and closed. One of these teeth 3a is provided with a projection 5 located in the range of movement of a stop 6 formed on the light-excluding plate 7. The light-excluding plate may be arranged in front, behind or in the shutter casing. If it is disposed in front of the objective it at the same time serves to protect the front lens from dust. As shown in Fig. 3, a spring 8 tends to draw the light-excluding plate 7 into the path of the light rays entering the objective. Now if the camera is brought into the position of readiness, the projection 5 presses the stop 6 and therefore the light-excluding plate 7 to one side, so that the camera is ready for taking photographs (see Figs. 1 and 2).

What I claim is:

1. In a photographic camera in combination, a casing, an objective board, toggle members for connecting said objective board with said casing, an objective mounted on said objective board, means adapted to be brought in the path of the light rays projecting from said objective towards said casing for screening them off, and means co-operating with said toggle members for removing said screening means from the path of said light rays on opening the camera and inserting said screening means into the path of the light rays on folding the camera.

2. In a photographic camera in combination, a casing, an objective board, toggle members for connecting said objective board with said casing, an objective mounted on said objective board, a plate adapted to be brought in the path of the light rays projecting from said objective towards said casing for screening them off, and means co-operating with said toggle members for removing said plate from the path of said light rays on opening the camera and inserting said plate into the path of the light rays on folding the camera.

3. In a photographic camera in combination, a casing, an objective board, toggle members for connecting said objective board with said casing, an objective mounted on said objective board, a plate rotatably mounted on said objective board adapted to be brought in the path of the light rays projecting from said objective towards said casing for screening them off, a spring having one of its ends attached to said objective board and the other to said plate so that it draws said plate into the path of the light rays, teeth provided on said toggle members, a stop provided on said plate, the teeth of one of said toggle members engaging said stop, said stop and said teeth co-operating so that on opening said camera said plate is removed from the path of the light rays and on folding the camera is inserted in the path of the light rays.

LEO GOLDHAMMER.